(12) United States Patent
Sang et al.

(10) Patent No.: US 6,891,843 B1
(45) Date of Patent: May 10, 2005

(54) APPARATUS AND METHOD FOR SHARING MEMORY USING EXTRA DATA PATH HAVING MULTIPLE RINGS

(75) Inventors: Jinqlih (Charlie) Sang, Fremont, CA (US); Shashank Merchant, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/562,927

(22) Filed: May 2, 2000

Related U.S. Application Data (60) Provisional application No. 60/177,344, filed on Jan. 24, 2000.

(51) Int. Cl.[7] .............................. H04L 12/28; H04J 3/24
(52) U.S. Cl. ....................................... 370/406; 370/474
(58) Field of Search ................................. 370/258, 403, 370/404, 406, 452, 460, 474, 405, 468

(56) References Cited

U.S. PATENT DOCUMENTS

| | | | | |
|---|---|---|---|---|
| 4,884,192 A | * | 11/1989 | Terada et al. ............... | 709/251 |
| 5,119,373 A | * | 6/1992 | Fredricsson et al. ......... | 370/458 |
| 5,457,683 A | * | 10/1995 | Robins ........................ | 370/258 |
| 5,572,526 A | * | 11/1996 | Cidon et al. ................. | 370/452 |
| 5,590,131 A | * | 12/1996 | Kabatepe ..................... | 370/461 |
| 5,594,734 A | * | 1/1997 | Worsley et al. ......... | 370/395.53 |
| 5,659,781 A | * | 8/1997 | Larson ........................ | 712/11 |
| 5,867,484 A | * | 2/1999 | Shaunfield .............. | 370/395.51 |
| 5,886,992 A | * | 3/1999 | Raatikainen et al. ....... | 370/410 |
| 6,658,016 B1 | * | 12/2003 | Dai et al. ................... | 370/424 |
| 6,661,972 B1 | * | 12/2003 | Arecco .......................... | 398/3 |

\* cited by examiner

*Primary Examiner*—Chau Nguyen
*Assistant Examiner*—Andy Lee (57) ABSTRACT

Multiple network switches are configured having memory interfaces that transfer segmented frame data to each other via a data path having multiple rings connecting the network switches. The memory interfaces are also configured for transferring the segmented frame data to respective local buffer memories for temporary storage. The data path transfers the data units between the switches according to a prescribed sequence protocol, optimizing memory bandwidth by requiring only one read and one write operation to and from a local buffer memory for each segmented frame data being received and transmitted through the switches.

11 Claims, 7 Drawing Sheets

| Time Slots / Data Path Inputs | 1 | 2 | 3 | 4 | 5 | 6 | 7 | 8 |
|---|---|---|---|---|---|---|---|---|
| $I_1$ | $A_1$ | $A_2$ | $A_3$ | $A_4$ | | | | |
| $I_2$ | | $B_1$ | $B_2$ | $B_3$ | $B_4$ | | | |
| $I_3$ | | | $C_1$ | $C_2$ | $C_3$ | $C_4$ | | |
| $I_4$ | | | | $D_1$ | $D_2$ | $D_3$ | $D_4$ | |

FIG. 7

| Time Slots / Data Path Outputs | 1 | 2 | 3 | 4 | 5 | 6 | 7 | 8 |
|---|---|---|---|---|---|---|---|---|
| $O_1$ | | $B_1$ | $C_1$ | $D_1$ | | | | |
| $O_2$ | | $A_2$ | | $C_2$ | $D_2$ | | | |
| $O_3$ | | | $A_3$ | $B_3$ | | $D_3$ | | |
| $O_4$ | | | | | $A_4$ | $B_4$ | $C_4$ | |

| Data Path Inputs \ Time Slots | 1 | 2 | 3 | 4 | 5 | 6 | 7 | 8 |
|---|---|---|---|---|---|---|---|---|
| $I_1$ | | $B_1$ | $C_1$ | $D_1$ | | | | |
| $I_2$ | | $A_2$ | | $C_2$ | $D_2$ | | | |
| $I_3$ | | | $A_3$ | $B_3$ | | $D_3$ | | |
| $I_4$ | | | | $A_4$ | $B_4$ | $C_4$ | | |

FIG. 10

| Data Path Outputs \ Time Slots | 1 | 2 | 3 | 4 | 5 | 6 | 7 | 8 |
|---|---|---|---|---|---|---|---|---|
| $O_1$ | | $A_2$ | $A_3$ | $A_4$ | | | | |
| $O_2$ | | $B_1$ | | $B_3$ | $B_4$ | | | |
| $O_3$ | | | $C_1$ | $C_2$ | | $C_4$ | | |
| $O_4$ | | | | $D_1$ | $D_2$ | $D_3$ | | |

APPARATUS AND METHOD FOR SHARING MEMORY USING EXTRA DATA PATH HAVING MULTIPLE RINGS

RELATED APPLICATION

This application contains subject matter related to the subject matter disclosed in copending U.S. Provisional Patent Application Ser. No. 60/177,344, filed on Jan. 24, 2000.

FIELD OF THE INVENTION

The present invention relates to computer network interfacing and switching, and more particularly, to an apparatus and method for efficiently storing and forwarding data frames within a multiple ring configuration with multiple multiport network switches.

BACKGROUND ART

A multiport network switch in a packet switching network is coupled to stations on the network through its multiple ports. Data sent by one station on the network to one or more other stations on the network are sent through the network switch. The data is provided to the network switch over a shared access medium according to, for example, an Ethernet protocol (IEEE Std. 802.3). The network switch, which receives a data frame at one of its multiple ports, determines a destination network station for the data frame from information contained in the data frame header. Subsequently, the network switch transmits the data from the port or ports connected to the destination network station or stations.

A single Ethernet network switch may have a number of 10/100 Mb/s ports, equaling, for example, 12 ports. The number of end stations connected to the single network switch is limited by the number of ports (i.e., port density) of the network switch. However, users of networking devices demand flexibility and scalability in their networks. To address this need, modular architectures have been developed that enable cascading of identical networking devices or network switch modules. By cascading these devices (or components) in a loop, port density can be readily increased without redesign or development of costly interfaces.

Figure 1:
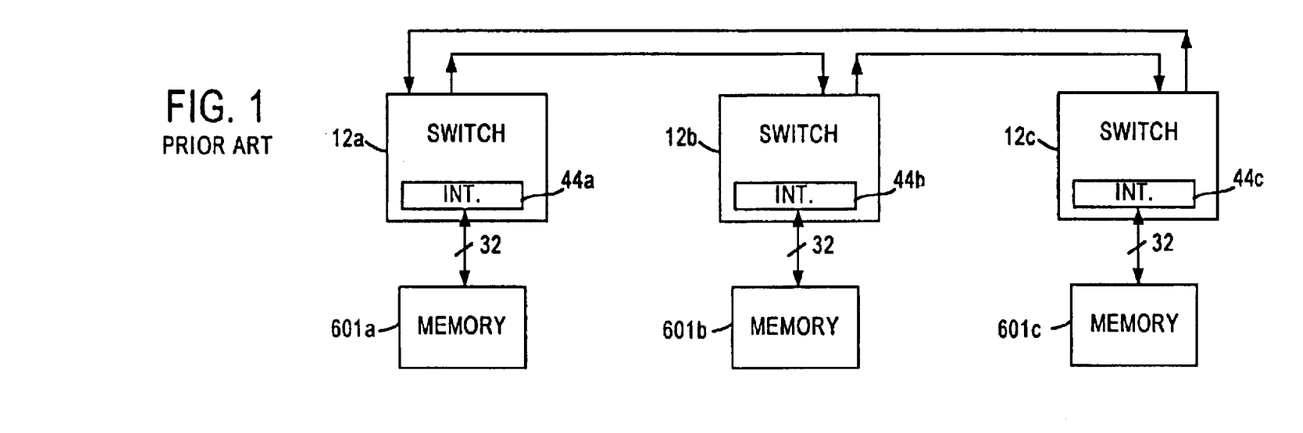
FIG. 1 is a block diagram illustrating a conventional switching arrangement that cascades multiple switch modules.

Unfortunately, as the number of cascaded switches increases, so does the system latency (i.e., the aggregate processing delay of the switches). System latency is attributable, in part, to the manner in which the switches store and retrieve the data frames in memory. One traditional memory architecture employs individual, local memories for each cascaded switch, as shown in FIG. 1. In this example, three multiport switches 12a, 12b, and 12c are cascaded together to permit the exchange of data frames received by any one of the switches and subsequent forwarding of the data frames out of a different multiport switch. Each of these switches 12a, 12b, and 12c has a memory interface, 44a, 44b, and 44c, respectively. These memory interfaces 44a, 44b, and 44c enable switches 12a, 12b, and 12c to access their respective memories 601a, 601b, and 601c to write and read the data frames.

For explanation purposes, it is assumed that a data frame is received at a port (i.e., receive port) on switch 12a and that the data frame destination is a node attached to a port on a different switch 12c. Switch 12a first stores the received data frame in memory 601a, and then determines whether to forward the received data frame out of its own port or send it to the next switch in sequence. Because the data frame is not destined to any port of switch 12a, the data frame is retrieved from memory 601a and sent to the next switch 12b via the cascade port (i.e., the port to which the neighboring switches are connected) of switch 12a. Upon receiving the data frame, switch 12b stores the data frame in memory 601b. Switch 12b then examines the data frame and determines that it should be forwarded to switch 12c. Accordingly, switch 12b forwards the data frame to switch 12c by reading the stored received data frame from memory 601b and sending the data frame out its cascade port. When the data frame arrives at switch 12c, switch 12c writes the data frame into its memory 601c, in similar fashion as the other switches 12a and 12b. At this point, however, switch 12c determines that the data frame should be forwarded out one of its ports, which is connected to the destination node. Hence, switch 12c reads the stored data frame and forwards it out the appropriate port. As evident by this example, the data frame, as it is transferred from switch to switch is stored and read numerous times into the memories of the respective switches. The series of write and read operations disadvantageously imposes costly delay in the switching system.

Figure 2:
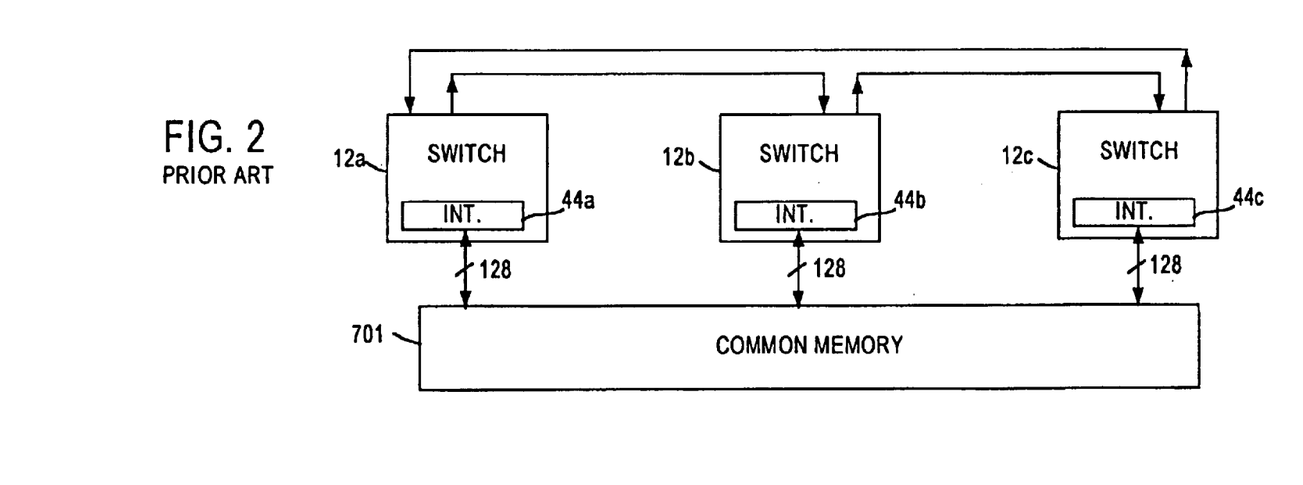
FIG. 2 is a diagram illustrating an alternative prior art arrangement using cascaded switching modules to store data frames in a common memory.

To address this latency problem, one conventional approach is to employ a common memory among the various switches. FIG. 2 illustrates such a system in which switches 12a, 12b, and 12c share u memory 701 via memory interfaces 44a, 44b, and 44c, respectively. Under this approach, the interfaces 44a, 44b, and 44c are required to have a wider data bus to maintain the speed of read and write accesses as compared to the individual memory arrangement of FIG. 8. For example, the bus width of the memory interfaces 44a, 44b, and 44c may need to increase to 128 bits. The main drawback with this common memory implementation is that the increase in memory bandwidth also results in a proportionate increase in the pin count. An increase in the number of pins disadvantageously requires more area on the circuit board, resulting in greater package cost.

SUMMARY OF THE INVENTION

There is a need for an arrangement to connect two or more multiport network switches together to increase port density, without increasing the memory bandwidth and a corresponding proportionate increase in pin count.

This and other needs are met by embodiments of the present invention which provides a multiport network switch arrangement having a plurality of multiport network switches each having a corresponding local buffer memory. The network switches in the arrangement are configured to segment each data frame received at an input port into equal data segments so that data frames may be divided and stored equally among the local buffer memories, thus, in essence, creating a "shared memory" arrangement.

One aspect of the present invention provides a network switch arrangement having a plurality of multiport network switches each having a corresponding local buffer memory. The arrangement includes a data path circuit connected to each of the plurality of network switches, the data path having a plurality of data path rings for transferring data units of a data frame from at least one of the multiport network switches at least another one of the multiport network switches for storage of the transferred data units in the at least another one of the multiport network switches. Transmitting the data frame segments to other network switches allows the storage of the data frame to be distributed equally over all the local buffer memories. Hence, the bandwidth required for each local buffer memory can be minimized. Additionally, the use of multiple data path rings affords the arrangement expandability with varied numbers of network switches.

Another aspect of the invention provides a method for receiving and transmitting data frames in a network switch arrangement. The method includes receiving a corresponding data frame at each of a plurality of network switches and segmenting each of the data frames within a corresponding network switch into a prescribed number of data units. Next the data units are sequentially transferred from at least one of the plurality of network switches to an input of a data path circuit during corresponding consecutive time slots. The transferred data units are then sequentially routed within the data path circuit during consecutive time slots to at least another of the plurality of network switches according to a prescribed sequence protocol. Finally, the routed data units are stored in a buffer memory connected to the at least another of the plurality of network switches. This method serves to distribute the segments of a data frame between the memories of the switches. Hence, the method affords lower bandwidth requirements for each the switch memories and data paths transferring data between the network switches. Additionally, by utilizing a data path circuit, the arrangement is afforded expandability with varied numbers of network switches.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral represent like elements throughout and wherein.

DETAILED DESCRIPTION OF PREFERRED EMBODIMENTS

Switch Architecture Overview

Figure 3:
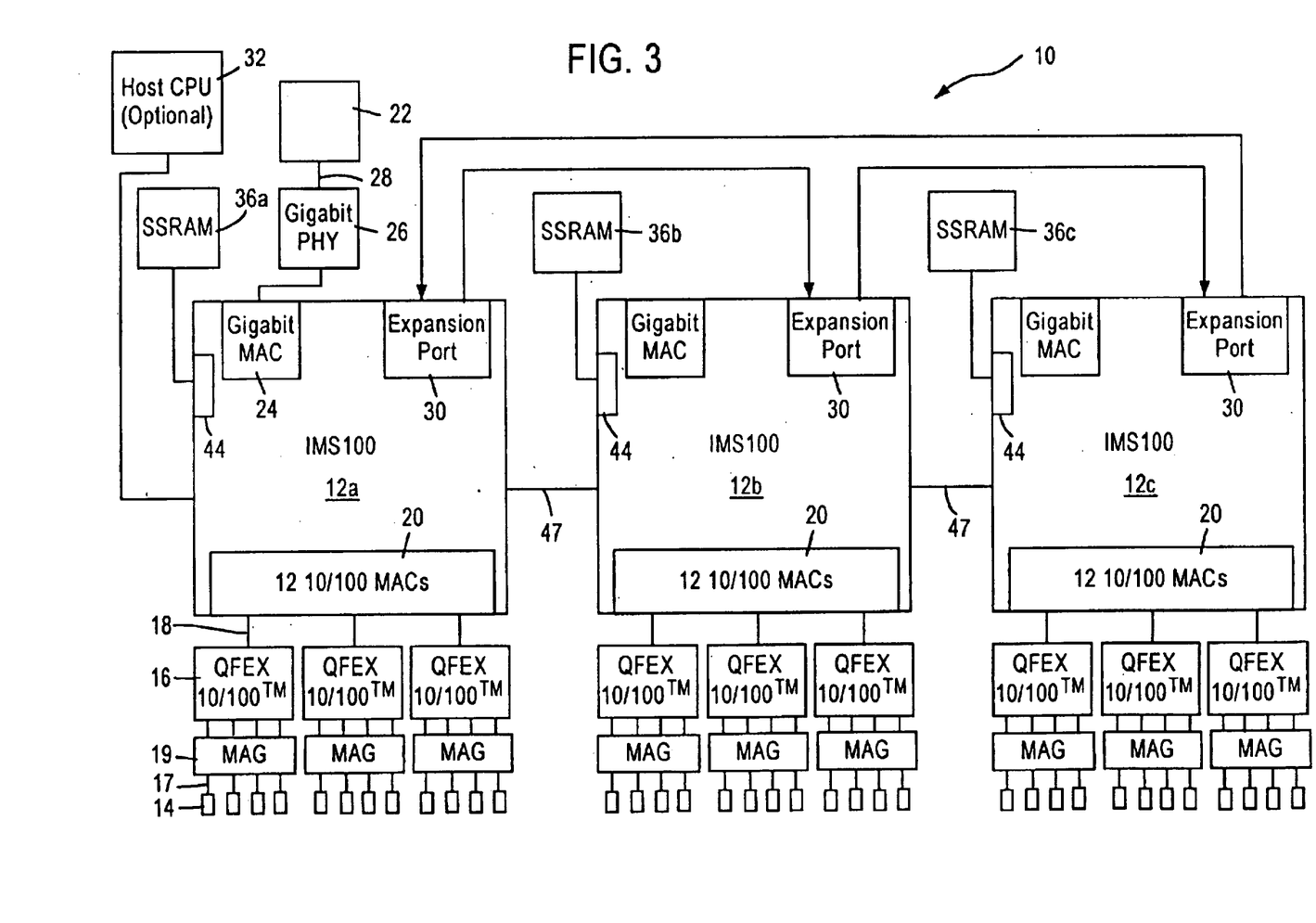
FIG. 3 is a diagram illustrating a switching system according to an embodiment of the present invention.

FIG. 3 is a block diagram of an exemplary three switch system in which the present invention may be advantageously employed. The system 10 is a packet switched network, such as an Ethernet (IEEE 802.3) network. The packet switched network includes integrated multiport switches (IMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 MWs (i.e., 1 Gb/s) network node 22 that sends and receives data packets at a network speed of 1 Gb/s. The gigabit node 22 may be a server, or a gateway to a high-speed backbone network. Hence, the multiport switches 12 selectively forward data packets received from the network nodes 14 or 22 to the appropriate destination based upon Ethernet protocol.

Each multiport switch 12 includes a media access control (MAC) module 20 that transmits and receives data packets to and from 10/100 Mb/s physical layer (PHY) transceivers 16 via respective reduced media independent interfaces (RMII) 18 according to IEEE 802.3u protocol. Each multiport switch 12 also includes a gigabit MAC 24 for sending and receiving data packets to and from a gigabit PHY 26 for transmission to the gigabit node 22 via a high speed network medium 28.

Each 10/100 Mb/s network station 14 sends and receives data packets to and from the corresponding multiport switch 12 via a media 17 and according to either half-duplex or full duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. Traffic in a half-duplex environment is not distinguished over the medium 17. Rather, each half-duplex station 14 includes an Ethernet interface device that uses carrier-sense multiple access with collision detection (CSMA/CD) to listen for traffic on the media. The absence of network traffic is detected by sensing deassertion of a receive carrier on the media. Any station 14 having data to send will attempt to access the channel by waiting a predetermined time, known as the interpacket gap interval (IPG), after deassertion of the receive carrier on the media. If a plurality of stations 14 have data to send on the network, each of the stations will attempt to transmit in response to the sensed deassertion of the receive carrier on the media and after the IPG interval, possibly resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding multiport switch 12.

Each multiport switch 12 is coupled to 10/100 physical layer (PHY) transceivers 16 configured for sending and receiving data packets to and from the corresponding multiport switch 12 across a corresponding reduced media independent interface (R.MII) 18. In particular, each 10/100 PHY transceiver 16 is configured for sending and receiving data packets between the multiport switch 12 and up to four (4) network stations 14 via the RNUI 18. A magnetic transformer 19 provides AC coupling between the PHY transceiver 16 and the corresponding network medium 17. Hence, the RMII 18 operates at a data rate sufficient to enable simultaneous transmission and reception of data packets by each of the network stations 14 to the corresponding PHY transceiver 16.

Each multiport switch 12 also includes an expansion port 30 for transferring data between other switches according to a prescribed protocol. Each expansion port 30 enables multiple multiport switches 12 to be cascaded together as a separate backbone network.

Shared Memory Multiple Ring Architecture

An embodiment of the present invention is directed to a network switch arrangement that has the capability to minimize the required memory bandwidth. Multiple network switches are connected to one another via a multiple ring architecture, preferably contained within a data path circuit. This architecture advantageously permits the sharing of buffer memories across multiple switches, thereby minimizing the requisite memory bandwidth for each individual buffer memory. Another advantage of this architecture is that it requires only a single memory access for writing data to the memory and a single memory access for reading data from the memory.

Figure 4:
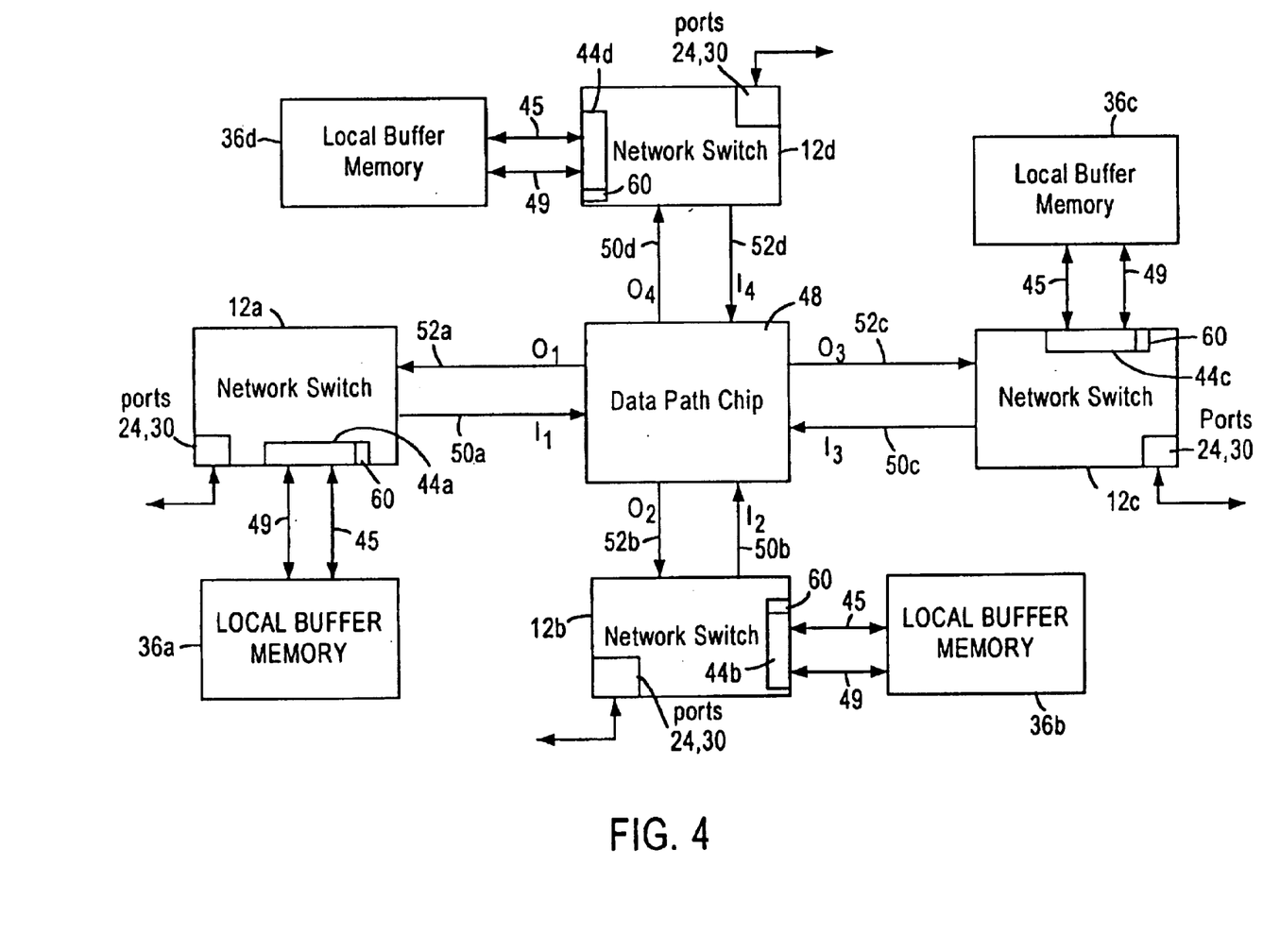
FIG. 4 is a block diagram illustrating in further detail the switching system of FIG. 3 including a data path circuit.

FIG. 4 is a block diagram of a network switch system according to an embodiment of the present invention. As shown in FIG. 4, each multiport switch 12 includes a memory interface 44 for dividing a received frame into equal segments, or data units. The memory interface 44, in turn, outputs the data units of the received data either onto a data bus 45 for transfer to the local buffer memory (i.e., SSRAM 36) or to a data path circuit 48 via an input bus 50a–50d for transfer of the data units to another buffer memory 36. Preferably, the input bus 50 is comprised of a 64-bit data bus running at 100 MHz.

Each of the switches 12 has a corresponding local buffer memory 36 configured for storing data units of data frames received from each of the multiport switch modules. For example, SSRAM 36a is configured for receiving frame data as data units for data frames received by each of the switch modules 12a, 12b, and 12c. Each memory interface 44 of FIG. 4 is configured for holding and transferring data units of frame data either to the corresponding buffer memory 36, or to another one of the memory interfaces 44 of the other network switches via the data path circuit 48 for transfer and storage in another local buffer memory 36. Each of the memory interfaces 44 also includes a scheduler 60. The scheduler 60 controls the writing and reading of data units between the plurality of local buffer memories 36 according to a prescribed access protocol, described in detail below with respect to FIG. 6. In particular, each scheduler 60 determines, according to the prescribed protocol, whether a given data unit should be transferred to the corresponding memory 36, or should be transferred to another memory interface 44.

In order to communicate the buffer address locations within the network switch system, each data path has a corresponding address bus (62 shown in FIG. 5) that allows the memory interfaces 44 to communicate memory locations to each other. In addition, an address bus 49 is located between each memory interface 44 and each SSRAM 36 so that the memory interface may communicate the buffer address location of data frame segments when they are either being written in or retrieved from the local buffer memory 36. In a preferred embodiment, the address bus is an 18-bit address bus running at 100 MHz.

Preferably, each data frame received at the port 24, 30 of a network switch 12 is transferred to the scheduler 44 which, in turn, segments the data frame into data units of equal length. The number of data units corresponding to each received data frame is preferably equal to the number of network switches in the arrangement (e.g., four arrangement shown in FIG. 4 corresponding to the four network switches 12 a, b, c & d). In a preferred embodiment, the segment lengths are a predetermined length, irrespective of the length of the received frame and are determined, for example, by dividing the maximum frame length (e.g., 1526 bytes under IEEE 802.3 Packet Format) by the number of segments (i.e., 4 in a preferred embodiment). Hence, if a data frame is received that is less than the maximum frame length, the memory interface 44 continues to create segments with a length according to the predetermined length. The remaining segments are filled by "dummy" segments so that the number of segments remains the same for each data frame.

In a preferred embodiment of the invention, the scheduler 44a of switch 12a divides a received frame A into four equal data units $A_1$, $A_2$, $A_3$ and $A_4$ as the frame is being received. Similarly, data frames B, C and D received respectively by switches 12b, 12c and 12d are divided by their respective schedulers 44 into four data units as they are being received. The function of the data path circuit 48 is to divide data units of each data frame between each of the network switches 12 in the arrangement so that the units of the data frame are stored equally across the local buffer memories 36 of the system. Hence, the local buffer memories are "shared" for storing each data frame received by any of the switches 12 in the system.

Figure 5:
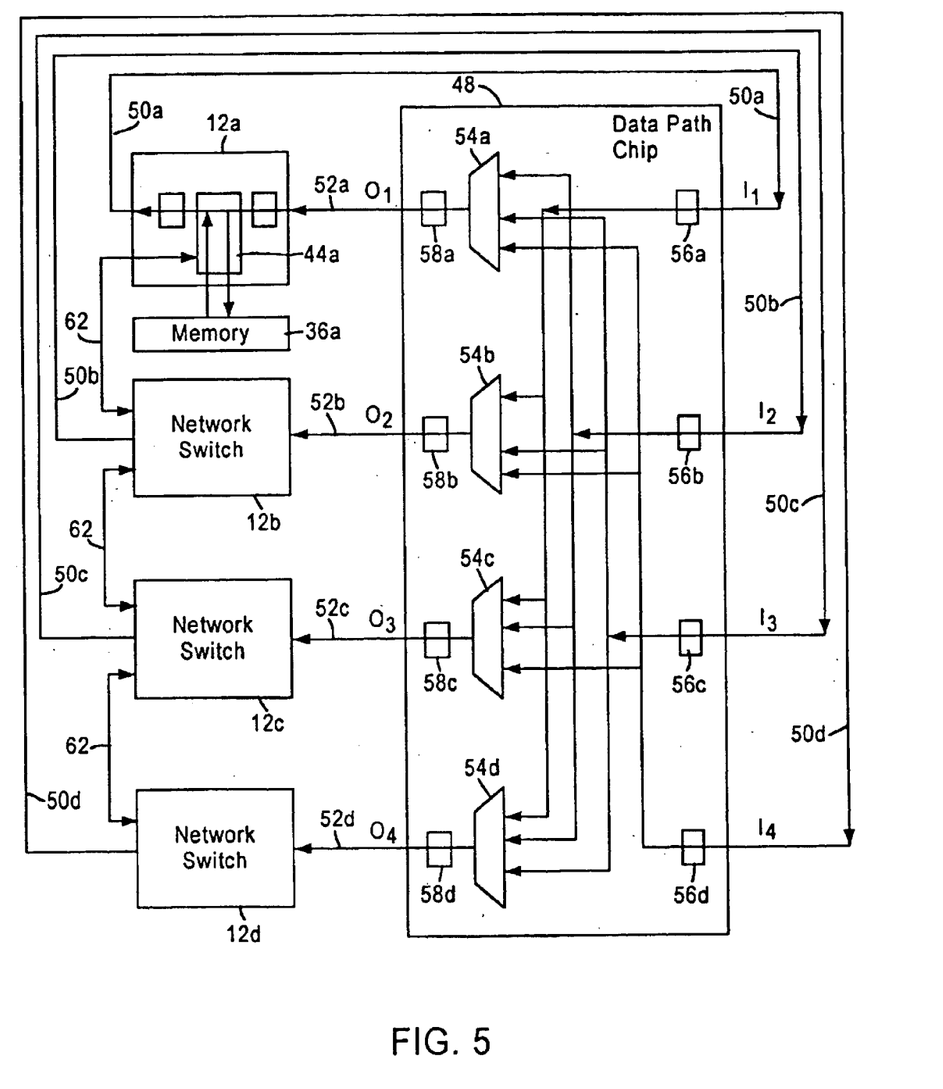
FIG. 5 is a diagram illustrating in further detail the multiple ring architecture of the data path circuit according to an embodiment of the present invention.

FIG. 5 illustrates in more detail the structure of the data path circuit 48 used to transfer the data units between the network switch modules 12. As shown in FIG. 5, the data path circuit 48 has four inputs $I_1$–$I_4$ connected to respective network switches 12a–12d via unidirectional input busses 50a–50d. The data path circuit 48 also contains four outputs 01–04 connected to the respective networks switches 12a–12d by unidirectional output busses 52a–52d. The combination of an input bus (e.g., 50a) with an output bus (e.g., 52a) constitutes a data ring. Associated with each data ring, is a multiplexer 54 that receives input from each of the other data rings. For example, multiplexer 54a associated with input bus 50a and 52a, connecting switch 12a to the circuit 48, receives input via internal data paths from the other three input buses 50b–50d. Additionally, each data ring includes elasticity buffers 56 and 58 on the input and output sides of each multiplexer 54 for temporary storage of data units during transfer of the units through the data path circuit 48.

Figure 6:
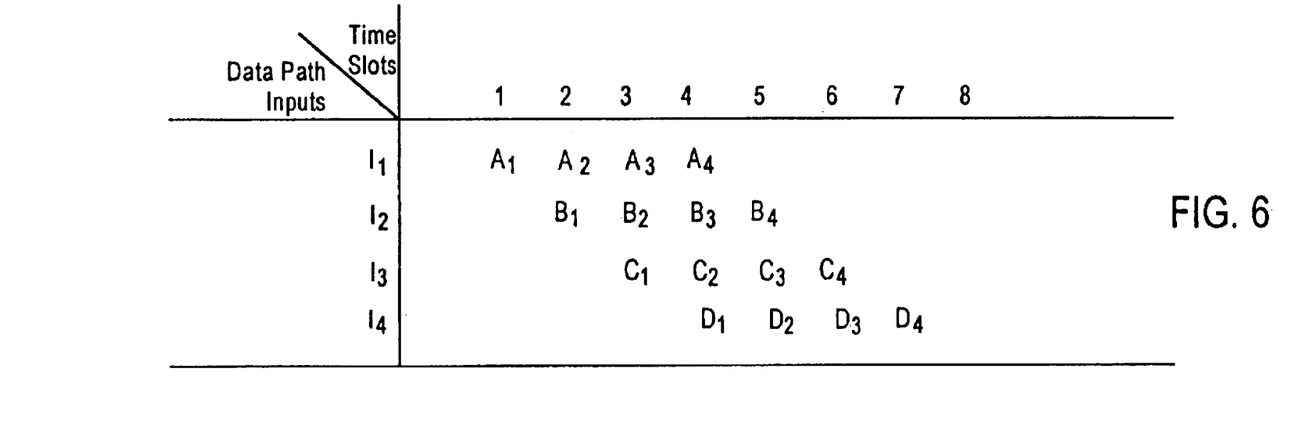
FIG. 6 is a diagram illustrating the transfer of data from the switches to the data path circuit during a queuing sequence according to an embodiment of the present invention.

As an example of the operation of a preferred network switch arrangement, a data frame A is assumed as begin being received by the memory interface 44a from the ports (i.e., 24 and 30) in switch 12a during a first time slot. As data frame A is received, the memory interface 44a begins to divides the frame into data units. During a first time slot, a first data unit $A_1$ is transmitted by memory interface 44a via input bus 50a to input $I_1$, of the data path circuit 48. As an illustration, FIG. 6 shows the data units input to the data circuit inputs (i.e., $I_1$–$I_4$) during consecutive times slots in the storage or "queuing sequence. During a second time slot, scheduler 44a divides and transfers a second data unit A2 of data frame A to input I, as shown in FIG. 6. For further example, a data frame B is assumed to be received by the ports 24, 30 of network switch 12b during the second time slot. FIG. 6 illustrates that a first data unit B, of frame B is transferred by memory interface 44b to input $I_2$ of data circuit 48 via input bus 50b during-the second time slot. During a third time slot, a third unit $A_3$ of data frame A is transferred to input $I_1$ and a second unit B2 of frame B is transferred to input $I_2$. The transfer of data units to the data circuit continues at consecutive time slots until all data frames have been transferred to the data circuit. As further example, at consecutive time slots 3 and 4, data frames C and D begin to be received by network switches 12c and 12d, respectively. Similarly, the memory interfaces (44c and 44d) of these switches segment the received data frames and transfer data units to corresponding inputs 13 and 140f the data path circuit 48. Concurrently to the input of data units, the data path circuit 48 also begins to output the received data units to the network switches during the queuing sequence.

Figure 7:
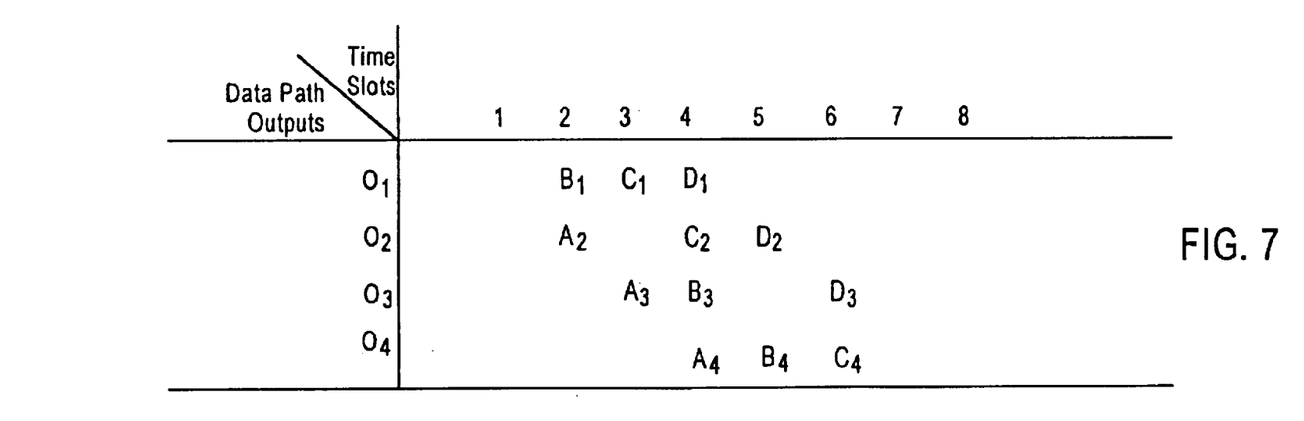
FIG. 7 is a diagram illustrating the transfer of data from the data path circuit to the network switches during a queuing sequence according to an embodiment of the present invention.
Figure 8:
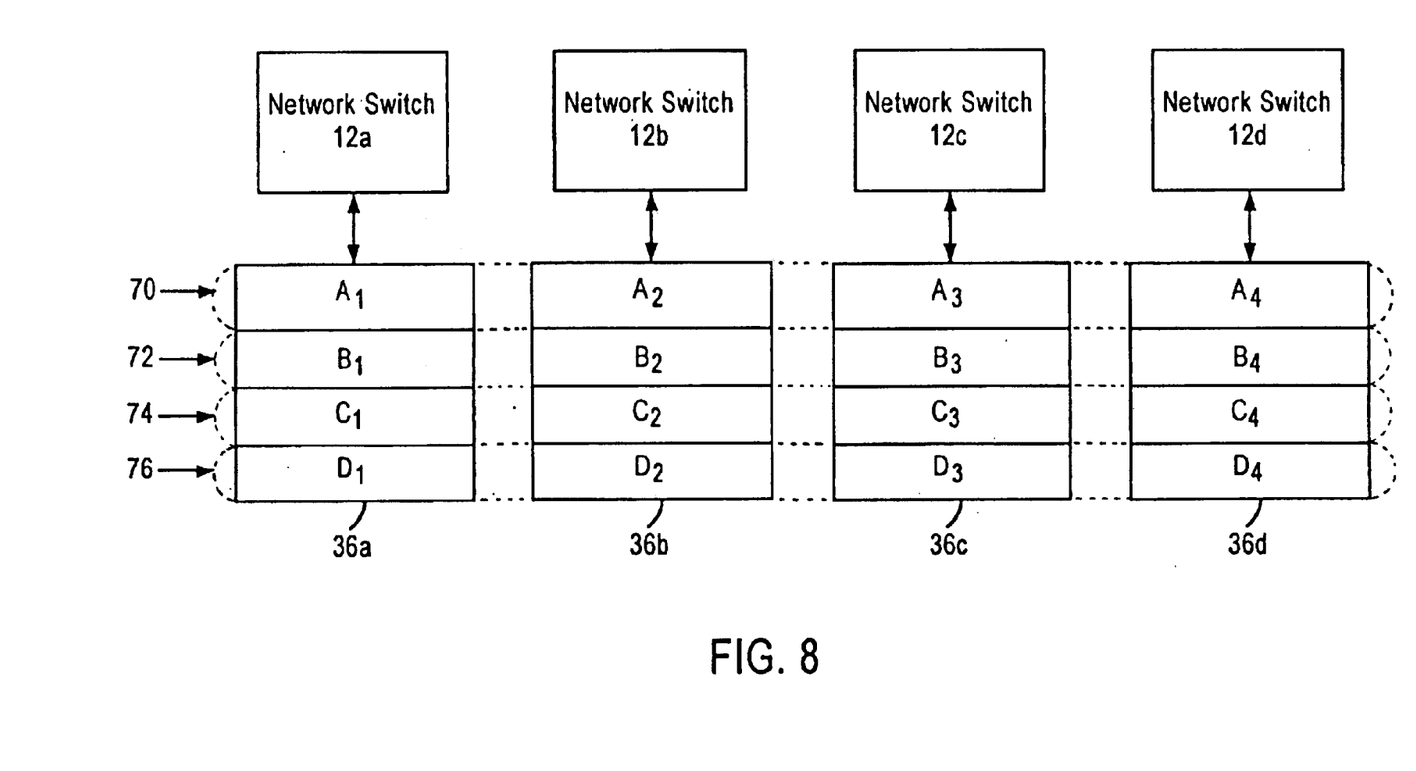
FIG. 8 is a diagram illustrating the local buffer memory locations for the data units of the frames stored in the memories.

FIG. 7 illustrates the data units that are output during the queuing sequence. As shown, data unit $B_1$, which was received at data input $I_2$, is Output from data path output $O_1$ to network switch 12a during the second time slot according to the internal data path routing of the data path circuit 48. Also, data unit $A_2$, received at input $I_1$, is output to network switch 12b via output $O_2$ according to a predetermined sequence protocol within the data path circuit 48. It is noted that at time slot 1 in FIG. 7, the received data unit $A_1$ is not output by the data path circuit 48. This is due to the fact that data unit $A_1$ is addressed and stored in local buffer memory 36a by the scheduler 44a during the first time slot. Hence, the predetermined logic (not shown) of the data path circuit 48 allows the data-unit $A_1$ of the data frame A to be discarded since it is already stored in memory 36a. To this effect, no connection is provided internally within the data circuit 48 for data from input $I_1$ to be transferred to multiplexer 54a. Similarly, the other inputs $I_2$–$I_4$ do not connect internally with corresponding multiplexers 54b–54d since, according to a predetermined protocol, each network switch stores a data unit of the frame it receives corresponding to the temporal position of the network switch. For example, FIG. 8 illustrates that network switch 12a, which receives a data frame A during a first time slot, stores the first data unit of each frame received by the network switch system. Network switch 12b, receiving data frame B at a second time slot, stores the second data unit of each data frame, and so on with switches 12c and 12d, which received frames C and D at third and fourth time slots, respectively. Thus, at time slot 3 the second unit B2 of frame B is not output by the data path circuit 48 since network switch 12b, which received frame B, will directly store the second data unit of $B_2$ of frame B in its corresponding local memory buffer 36b. Similarly, data units $C_3$ and $D_4$ are not required to be output by data circuit 48, as illustrated in FIG. 7.

FIG. 8 also illustrates each memory interface 44 stores the data units of each frame in the same address locations 70, 72, 74 and 76. For example all of the units of data frame A are stored in location 70 within each of the local memory buffers 36. The address locations for the data units of a frame are communicated by the scheduler 60 in the network switch 12 receiving the frame to the memory interfaces 44 of the other network switches 12 via the address bus 62.

Figure 9:
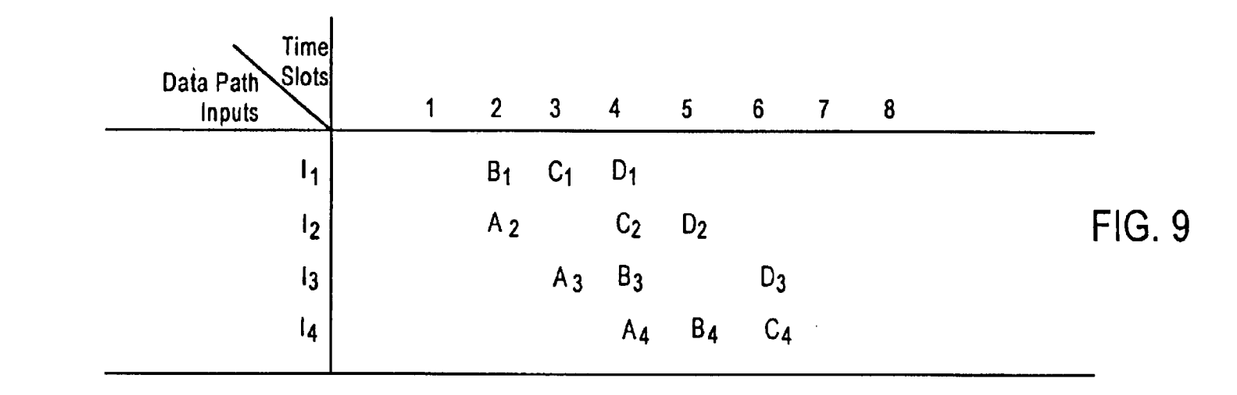
FIG. 9 is a diagram illustrating the transfer of data from the switches to the data path circuit during a dequeuing sequence according to an embodiment of the present invention.
Figure 10:
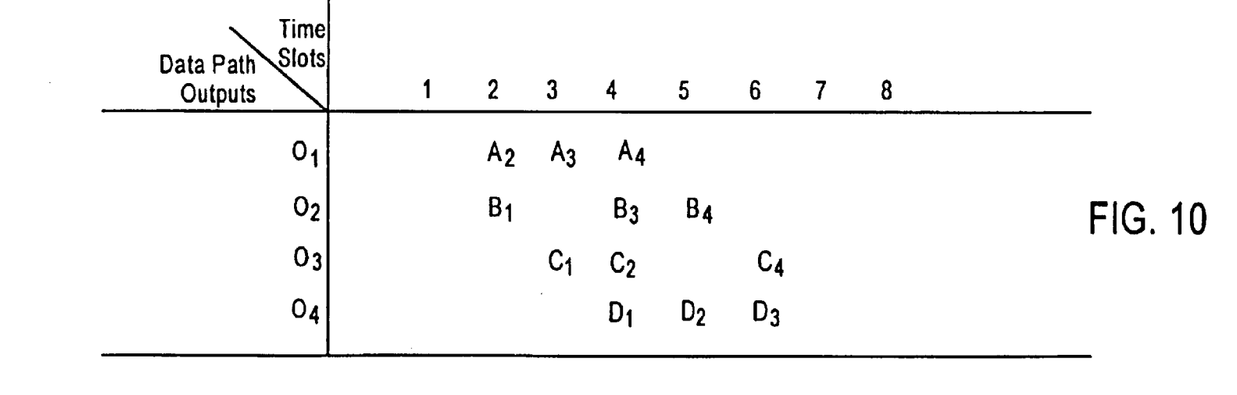
FIG. 10 is a diagram illustrating the transfer of data from the data path circuit to the network switches during a dequeuing sequence according to an embodiment of the present invention.

When the data frames are retrieved or "dequeued" from the local buffer memories 36, each of the memory interfaces 44 retrieves data units from its corresponding local buffer memory 36. The location of the data units is delineated by an address location transmitted by the scheduler 60 in one of the memory interfaces 44 to the other memory interfaces 44 via the address bus 62. Using the exemplary embodiment discussed above, if switch 12a must transmit Frame A over one of its ports 24, an address location for the frame's corresponding data units (i.e., $A_1$–$A_4$) is transmitted by memory interface 44a to the other memory interfaces 44 over the address bus. According to the prescribed protocol, each of the memory interfaces accesses the addressed memory location within its respective local buffer memory 36 and reads the data contained therein into the memory interface 44 during a time slot 1 (not the same time slot 1 shown in FIGS. 6 and 7) as shown in FIG. 9. Since the transmitting switch 12a already contains the first data unit $A_1$ this data unit is held by its memory interface 44a during subsequent time slots until the remaining data units $A_2$–$A_4$ are received by memory interface 44a. During the next consecutive time slot 2, data unit $A_2$ is transferred to input 12 of data path circuit 48 as shown in FIG. 10. The data unit $A_2$ is then routed according to the predetermined sequence protocol of the circuit 48 to output at $O_1$ for transfer to network switch 12a as illustrated in FIG. 10. By consecutive time slot 4, all of the remaining data units $A_3$ and $A_4$ for Frame A are transferred via output 01 to network switch 12a for re-assembly and transmission of the Frame A over the network switch ports 24, 30. Hence, the storage and retrieval of Frame A in the local buffer memories 36 requires only one write and one read operation for each unit of data of the frame.

As shown in FIGS. 9 and 10, during consecutive time slots, the other stored frames B, C and D are also sequentially retrieved and reassembled at their respective network switches according to the predetermined sequence protocol of the data path circuit 48. Similar to Frame A, the storage and retrieval of Frames B–D in the local buffer memories 36 requires only one write and one read operation for each unit of data of the frames.

The foregoing arrangement of the present invention affords the system with only one read and one write access requirement per data frame. Thus, the memory bandwidth of the SSRAM's and the data path can be maximized, without an increase in bandwidth. For example, a preferred embodiment of the present system only requires a 64-bit wide SSRAM and data path. It will be appreciated by those having skill in the art, that the preferred embodiment discussed above is not limited to four network switches 12. The arrangement is adaptable for network switch arrangements having either fewer or more than four network switches 12.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A network switch arrangement comprising:
   a plurality of multiport network switches each having a corresponding local buffer memory;
   a data path circuit having a pluralities of bidirectional data rings separately and respectively connected to each of the plural of network switches, the data path rings for transferring data units of a data frame form at least one of the multiport network switches to at least another one of the multiport network switches for storage of the transferred data units in the at least another one of the multiport network switches;

wherein each of the plurality of network switches has a corresponding external corresponding local buffer memory, each external memory interface-also configured to read and write segments to each local buffer memory associated with a corresponding network switch and transfer and receive data units over at least one of the plurality of data path rings; and wherein each memory interface is configured for segmenting a received data frame into a prescribed number of data units, the prescribed number corresponding to a number of network switches in the network switch arrangement.

2. The network switch arrangement of claim 1, further comprising:

an address bus connecting each of the plurality of network switches, the address bus configured for transmitting a memory address location that points to a memory location within each of the plurality of local buffer memories.

3. The network switch arrangement of claim 2, wherein the address bus in configured to transmit the memory address location pointer for at least one of retrieving and storing the equal length segments within the local buffer memories.

4. The network switch arrangement of claim 1 wherein the data path circuit further comprises:

a plurality of multiplexers coupled to the data path rings respectively, each multiplexer receiving data units corresponding at least one or more of the plurality of network switches and transferring the received data units to a corresponding at least one of the plurality of network switches according to a prescribed sequence protocol.

5. The original network switch arrangement of claim 1, wherein each data path ring is a 64-bits wide.

6. The network switch arrangement of claim 1, wherein each data path ring operates at a clock speed of 100 MHz.

7. The network switch arrangement of claim 2, wherein the address bus is an 18-bit data bus.

8. The network switch arrangement of claim 2, wherein each memory interface contains a corresponding scheduler for determining address locations for data units stored in the local buffer memories.

9. A method for receiving and transmitting data frames in a multiple network switch arrangement comprising the steps of:

receiving a corresponding data frame at each of a plurality of network switches;

segmenting each of the data frames within a corresponding network switch into a prescribed number of data units;

sequentially transferring the prescribed number of data units from at least one of the plurality of network switches to an input of a data path circuit during corresponding consecutive time slots;

sequentially routing the transferred data units within the data path circuit during consecutive time slots to at least another of the plurality of network switches according to a prescribed sequence protocol; and storing the routed data units in a buffer memory connected to the at least another of the plurality of network switches.

10. The method of claim 9, the data units are stored at a prescribed memory address within the buffer memory determined in accordance with the temporal sequence in which the data frame corresponding to the data units was received in the network switch arrangement.

11. The method of claim 9, further comprising the steps of:

accessing the data stored in the buffer memory;

transferring at least one of the accessed data units to the input of the data path circuit during sequentially consecutive time slots;

sequentially routing the accessed data units within the data path circuit during consecutive time slots to at least one other of the plurality of network switches according to the prescribed sequence protocol; and re-assembling the data frame from the routed accessed data units for transmission over a network.

* * * * *

UNITED STATES PATENT AND TRADEMARK OFFICE
CERTIFICATE OF CORRECTION

PATENT NO.    : 6,891,843 B1
DATED         : May 10, 2005
INVENTOR(S)   : Jinqlih Charlie Sang et al.

It is certified that error appears in the above-identified patent and that said Letters Patent is hereby corrected as shown below:

Column 9,
Line 1, delete "for"
Line 8, after the word "external", insert -- memory interface configured for connecting each corresponding network switch to the --
Lines 35-36, delete "corresponding at least "and insert -- input from --
Line 36, delete "of the plurality of"
Line 41, delete "original"

Signed and Sealed this

Second Day of August, 2005

JON W. DUDAS
*Director of the United States Patent and Trademark Office*